US010627266B2

(12) United States Patent
Neely

(10) Patent No.: US 10,627,266 B2
(45) Date of Patent: Apr. 21, 2020

(54) FLOWMETER WITH DISCONTINUOUS HELICOID TURBINE

(71) Applicant: Baker Hughes, a GE Company, LLC, Houston, TX (US)

(72) Inventor: Jeffrey Neely, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 161 days.

(21) Appl. No.: 15/717,632

(22) Filed: Sep. 27, 2017

(65) Prior Publication Data

US 2019/0094052 A1 Mar. 28, 2019

(51) Int. Cl.
*G01F 1/10* (2006.01)
*E21B 47/10* (2012.01)
*F01D 5/14* (2006.01)

(52) U.S. Cl.
CPC ............... *G01F 1/10* (2013.01); *E21B 47/10* (2013.01); *F01D 5/146* (2013.01); *F05D 2240/30* (2013.01); *F05D 2250/25* (2013.01)

(58) Field of Classification Search
CPC .................................. E21B 47/10; G01F 1/10
See application file for complete search history.

(56) References Cited

U.S. PATENT DOCUMENTS

| 1,893,233 | A | * | 1/1933 | Hull | G01P 13/004 |
| | | | | | 116/274 |
| 2,552,651 | A | * | 5/1951 | Skold | F04D 29/382 |
| | | | | | 416/200 R |
| 2,741,916 | A | | 4/1956 | Wiley et al. | |
| 3,036,460 | A | * | 5/1962 | Buck | E21B 33/1275 |
| | | | | | 324/168 |
| 3,145,566 | A | | 8/1964 | D'Amelio | |
| 3,244,002 | A | * | 4/1966 | Prono | G01F 1/00 |
| | | | | | 251/174 |
| 3,427,879 | A | | 2/1969 | Dee | |
| 3,504,990 | A | * | 4/1970 | Sugden | B63H 1/16 |
| | | | | | 415/124.1 |

(Continued)

FOREIGN PATENT DOCUMENTS

| EP | 0031629 A1 | 7/1981 |
| JP | 11325985 A | 11/1999 |
| JP | 2001165741 A | 6/2001 |

OTHER PUBLICATIONS

International Search Report and Written Opinion for PCT/US2018/050947 dated Jan. 7, 2019.

(Continued)

*Primary Examiner* — John Fitzgerald
(74) *Attorney, Agent, or Firm* — Hogan Lovells US LLP

(57) ABSTRACT

A flowmeter for use downhole estimates fluid flow with a helically shaped spinner member disposed in a path of the flowing fluid. Features, such as magnets, are mounted in the spinner member so that spinner member rotational rate can be sensed, thereby estimating fluid flow. Discontinuities along an axis of the spinner member define segments that are adjacent one another. Adjacent segments can differ angularly, by pitch, as well as by length. With the discontinuities, segment design is less constrained by the geometry of adjacent segments, so that feature locations on the spinner member are maintained, while maximizing sensitivity of the spinner member to fluid flow.

16 Claims, 6 Drawing Sheets

(56) References Cited

U.S. PATENT DOCUMENTS

| | | | | |
|---|---|---|---|---|
| 3,512,904 | A | * | 5/1970 | Allen ............... F04C 2/1073 |
| | | | | 418/48 |
| 3,604,265 | A | * | 9/1971 | Wilson, Jr. ............... G01F 1/10 |
| | | | | 73/861.352 |
| 3,863,806 | A | * | 2/1975 | Risser, Jr. ............... G01F 1/10 |
| | | | | 222/23 |
| 4,178,127 | A | | 12/1979 | Zahorecz |
| 4,345,480 | A | | 8/1982 | Basham et al. |
| 4,395,919 | A | * | 8/1983 | Peters ............... G01F 1/10 |
| | | | | 73/861.77 |
| 4,482,305 | A | | 11/1984 | Natkai et al. |
| 4,500,259 | A | * | 2/1985 | Schumacher ........ F03B 17/063 |
| | | | | 416/122 |
| 4,718,824 | A | * | 1/1988 | Cholet ............... E21B 43/128 |
| | | | | 417/14 |
| 4,852,401 | A | | 8/1989 | Hrametz et al. |
| 5,433,118 | A | * | 7/1995 | Castillo ............... G01F 1/115 |
| | | | | 335/303 |
| 5,439,359 | A | * | 8/1995 | Leroy ............... F04C 2/1073 |
| | | | | 418/48 |
| 5,890,875 | A | * | 4/1999 | Silvano ............... A63H 33/40 |
| | | | | 228/144 |
| 6,601,461 | B2 | * | 8/2003 | Maxit ............... G01F 1/10 |
| | | | | 73/152.06 |
| 6,948,910 | B2 | * | 9/2005 | Polacsek ............... F03D 1/0608 |
| | | | | 416/1 |
| 8,251,662 | B2 | * | 8/2012 | Parker ............... F03D 1/0633 |
| | | | | 416/176 |
| 8,610,304 | B2 | * | 12/2013 | Filardo ............... F03B 17/06 |
| | | | | 290/43 |
| 8,800,384 | B2 | | 8/2014 | Wooten |
| 8,985,947 | B2 | * | 3/2015 | Obrecht ............... F03D 1/0683 |
| | | | | 416/62 |
| 9,739,651 | B1 | * | 8/2017 | Al-Otaibi ............... G01F 1/36 |
| 9,915,144 | B2 | * | 3/2018 | Manzar ............... E21B 47/102 |
| 9,926,058 | B2 | * | 3/2018 | Sharrow ............... F03D 1/0625 |
| 2005/0039546 | A1 | * | 2/2005 | Payne ............... G01F 1/115 |
| | | | | 73/861.79 |
| 2008/0105040 | A1 | | 5/2008 | Bivens et al. |
| 2008/0282809 | A1 | * | 11/2008 | Varini ............... G01F 1/10 |
| | | | | 73/861.77 |
| 2010/0122584 | A1 | * | 5/2010 | Claisse ............... G01F 1/10 |
| | | | | 73/861.79 |
| 2015/0041122 | A1 | * | 2/2015 | Valsecchi ............... E21B 47/10 |
| | | | | 166/250.15 |
| 2015/0241254 | A1 | * | 8/2015 | DeVita ............... G01P 13/004 |
| | | | | 73/861.79 |
| 2016/0047229 | A1 | | 2/2016 | Fanini et al. |
| 2016/0116312 | A1 | * | 4/2016 | Frisch ............... G01F 1/10 |
| | | | | 73/861.74 |
| 2016/0130935 | A1 | | 5/2016 | Manzar et al. |
| 2016/0230542 | A1 | * | 8/2016 | Jaaskelainen ......... E21B 47/123 |
| 2017/0227388 | A1 | | 8/2017 | Vigneaux et al. |

OTHER PUBLICATIONS

B.K. Kirke, Limitations of Fixed Pitch Darrieus Hydrokinetic Turbines and the Challenge of Variable Pitch, Renewable Energy, vol. 36, Issue 3, Mar. 2011, pp. 893-897, found at www.sciencedirect.com/science/article/pii/S0960148110003988.

DMW Corporaton, web page, Model VPF, Vertical Mixed Flow Pump, Variable Pitch Blade Pump, found at www.dmw.co.jp/english/products/pumps/vpf/variable_pitch.html.

Faure Herman web page for Helical Turbine Flowmeters, found at www.faureherman.com/our-technologies/helical-turbine-flowmeters/.

* cited by examiner

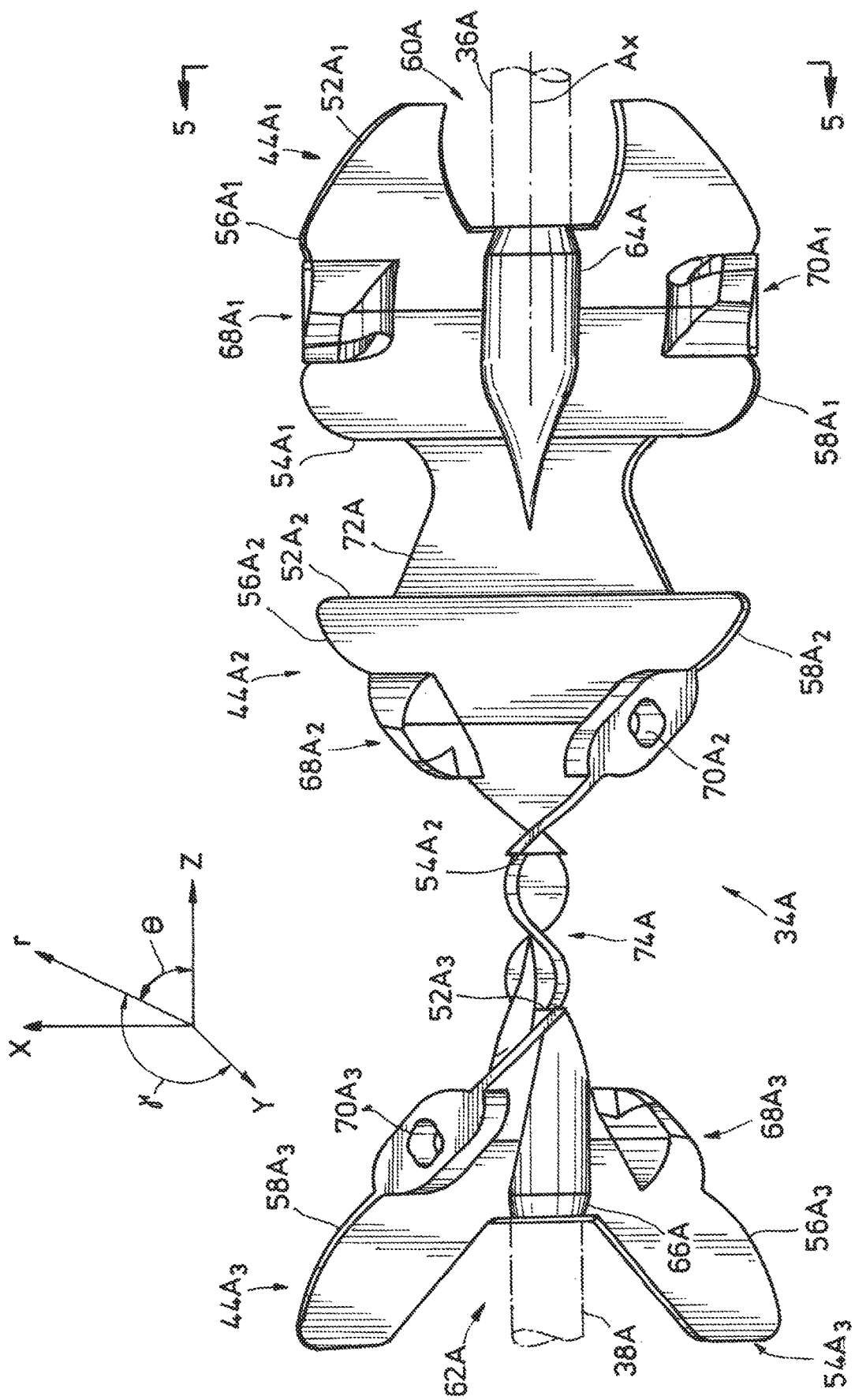

FLOWMETER WITH DISCONTINUOUS HELICOID TURBINE

BACKGROUND OF THE INVENTION

1. Field of Invention

The present disclosure relates in general to a system for use in monitoring flow in a wellbore. More specifically, the present disclosure relates to a flow meter that employs a helicoid shaped turbine that is discontinuous along its length.

2. Description of Prior Art

Flowmeters are typically included with fluid flow lines, where there is a desire or a need to have an estimate of the fluid flow rate in the flow line. Such a need or desire often occurs in facilities such as refineries, chemical processing plants, terminals for loading and offloading fluids, transmission pipelines, and the like. Some flowmeters are disposed external to a flow line, but most flowmeters have components within the flow line that interact with the fluid to obtain a measure of the flowrate. Some flowmeters include rotating elements, such as spinners, that rotate in response to the fluid flowing past the flow meter. These flow meters monitor the rotational velocity of the rotating element and correlate it to the fluid velocity. Other types of flow meters introduce a temporary restriction in the cross sectional area of the fluid stream and monitor a pressure differential created by flowing the fluid across the restriction.

Spinner type flowmeters generally include a propeller like member having blades that are oriented transverse to a direction of the flow. The propeller like member is usually mounted on a rotatable shaft, so that when the flowing fluid causes the propeller to rotate, monitoring shaft rotation yields an indication of fluid flow rate. Another type of spinner is formed by twisting a planar element into a helicoid, which also rotates when disposed in a flow of fluid. Here the helicoid is typically oriented in the flow stream so that an axis of the helicoid is parallel with a direction of the fluid flow. Helicoids, which are often referred to as helical spinners, are usually equipped with magnets along their lateral edges. Helical spinner rotational rate is estimated by using sensors that are spaced lateral to the helical spinners, and that sense the location and speed of the magnets. However, sensor location in the flowmeters is often dictated by sensor design or space limitations in the flowmeters. Meeting the constraints introduced by sensor location or spacing affects the helicoid profile, which can result in less than optimal helical spinner designs.

SUMMARY OF THE INVENTION

Disclosed herein is an example of a downhole device for use in a wellbore, and which includes a housing, a connector on the housing that selectively connects to a conveyance member, and a flowmeter coupled with the housing. In this example, the flowmeter is equipped with a helicoid shaped spinner member that selectively rotates in response to being disposed in a flow of fluid, the spinner member having a discontinuous surface that defines segments with opposing axial ends that are angularly offset from one another. The flowmeter further has features on the spinner member that orbit along a circular path with rotation of the spinner member, and sensors that selectively sense a position of the features. Optionally, adjacent segments are joined to one another by a coupling, and wherein the adjacent segments are spaced axially apart from one another. The coupling is optionally a planar member or a helicoid shaped member. Alternatives exist where adjacent segments have different values of pitch. In an embodiment, adjacent segments have different lengths. The features optionally are made of magnets. In one alternative example, the segments have a forward segment, and wherein a leading edge of the forward segment extends along a path that is generally oblique with an axis of the spinner member.

Also disclosed herein is an example of a downhole device for use in a wellbore, and which includes a flowmeter with helicoid shaped segments that are coupled together end to end to define a spinner member that is selectively disposed in a flow of fluid, and discontinuities on an outer surface of the spinner member that are formed by separations between the segments. A sensor is included with the flowmeter that selectively senses a rotational rate of the spinner member. In one embodiment, the segments are angularly offset. The segments alternatively have different value of pitch, and can have different lengths. Connectors are optionally provided between adjacent segments that couple the segments together.

Also disclosed herein is an example of a method of operating a downhole device in a wellbore, the steps being sensing a rotational rate of a spinner member disposed in the downhole device, and which includes segments coupled end to end and discontinuities along interfaces where the segments are coupled to one another, and estimating a rate of a flow of fluid in the wellbore based on the sensed rotational rate. In one example of the method, the discontinuity is an angular offset between a trailing edge of a segment and a leading edge of an adjacent segment. A magnet is optionally disposed on a lateral edge of the spinner member, and wherein sensing a rotational rate of the spinner member involves sensing the presence of the magnet at a location in a point in time. In an embodiment, the shapes of the segments are configured to maximize a sensitivity of the spinner member in response to the flow of fluid.

BRIEF DESCRIPTION OF DRAWINGS

Some of the features and benefits of the present invention having been stated, others will become apparent as the description proceeds when taken in conjunction with the accompanying drawings, in which:

FIG. 3 is a perspective view of an example embodiment of a spinner member for use with the spinner assembly of FIG. 2.

Figure 1:
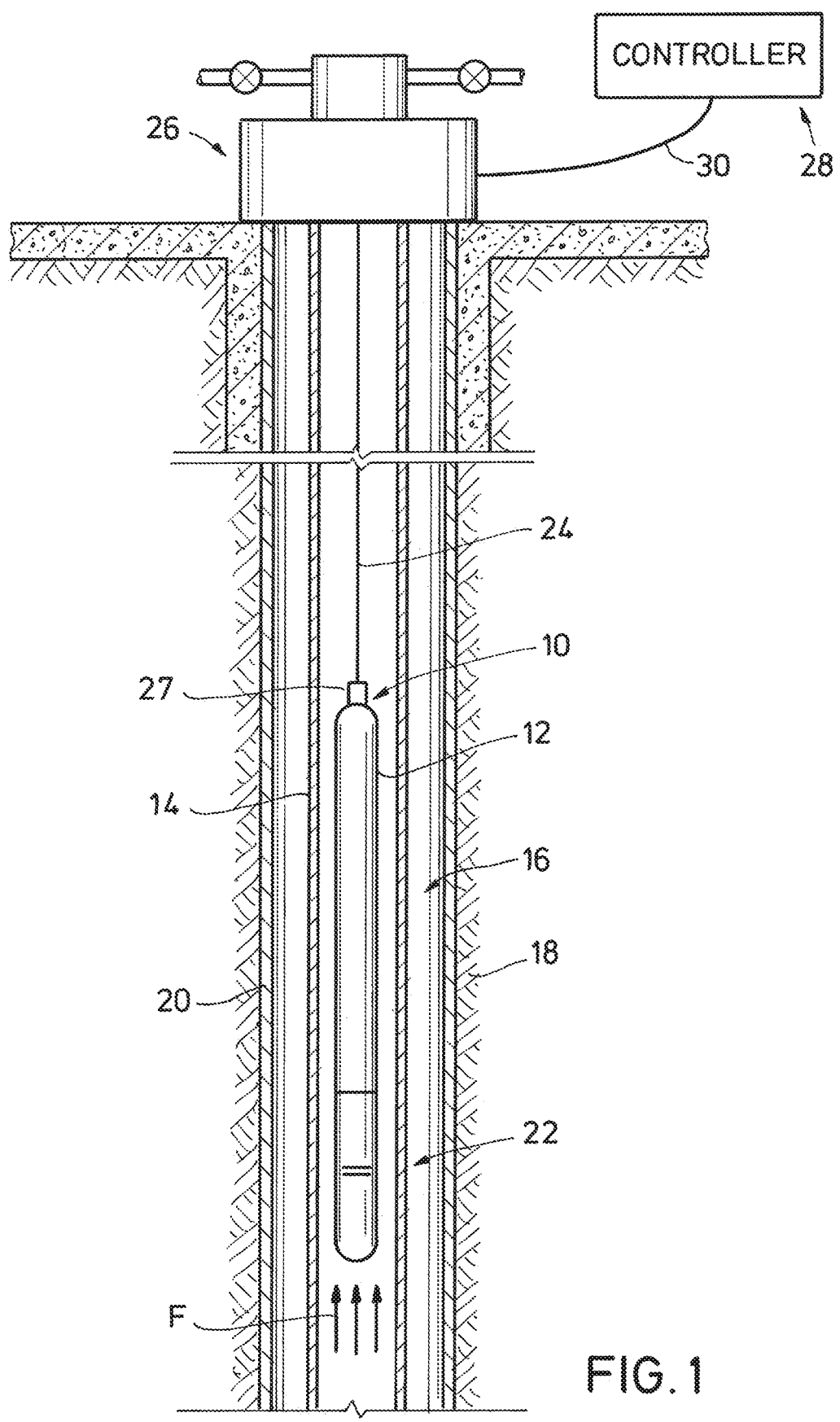
FIG. 1 is a side partial sectional view of an example of a downhole device disposed in a wellbore and which has a flowmeter for measuring a flow of fluid in the wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes+/−5% of the cited magnitude. In an embodiment, usage of the term "substantially" includes+/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a partial side sectional view in FIG. 1 is one example of a downhole device 10 which has an elongate housing 12 and is disposed in a length of production tubing 14. Tubing 14 is installed in a wellbore 16 that is shown intersecting a formation 18. Casing 20 lines the wellbore 16 and provides selective isolation of wellbore 16 from formation 18. Perforations (not shown) may be selectively formed through the casing 20 to allow fluid within formation 18 to make its way into wellbore 16 and into production tubing 14. A flow of fluid F produced from within formation 18 is shown within tubing 14 and making its way towards housing 12. Examples exist wherein the flow of fluid F includes liquid, gas, vapor, condensate, and combinations thereof. An example of a flow meter 22 is included with housing 12 and which is equipped for monitoring flowrate information about the flow of fluid F.

Downhole device 10 is shown deployed within wellbore 16 on a conveyance means 24, that can be a wireline, coiled tubing or slick line. Conveyance means 24 depends into the wellbore 16 from a wellhead assembly 26 shown on surface and mounted at an opening of the wellbore 16. In one embodiment, conveyance means 24 connects to a surface truck (not shown) on the surface and disposed outside of wellbore 16. In an example conveyance means 24 mounts to a spool mounted on an operations or drilling rig, such as when wellbore 16 is subsea. A controller 28, which in an example is included within surface truck, is shown coupled to a communication means 30, so that controller 28 is in selective communication with downhole device 10 via conveyance means 30. Examples of controller 28 are any type of information handling unit, including a processor for processing data received from downhole device 10, transmitting instructions from controller 28 to downhole device 10, and which includes hardware for storing electronic information.

Figure 2:
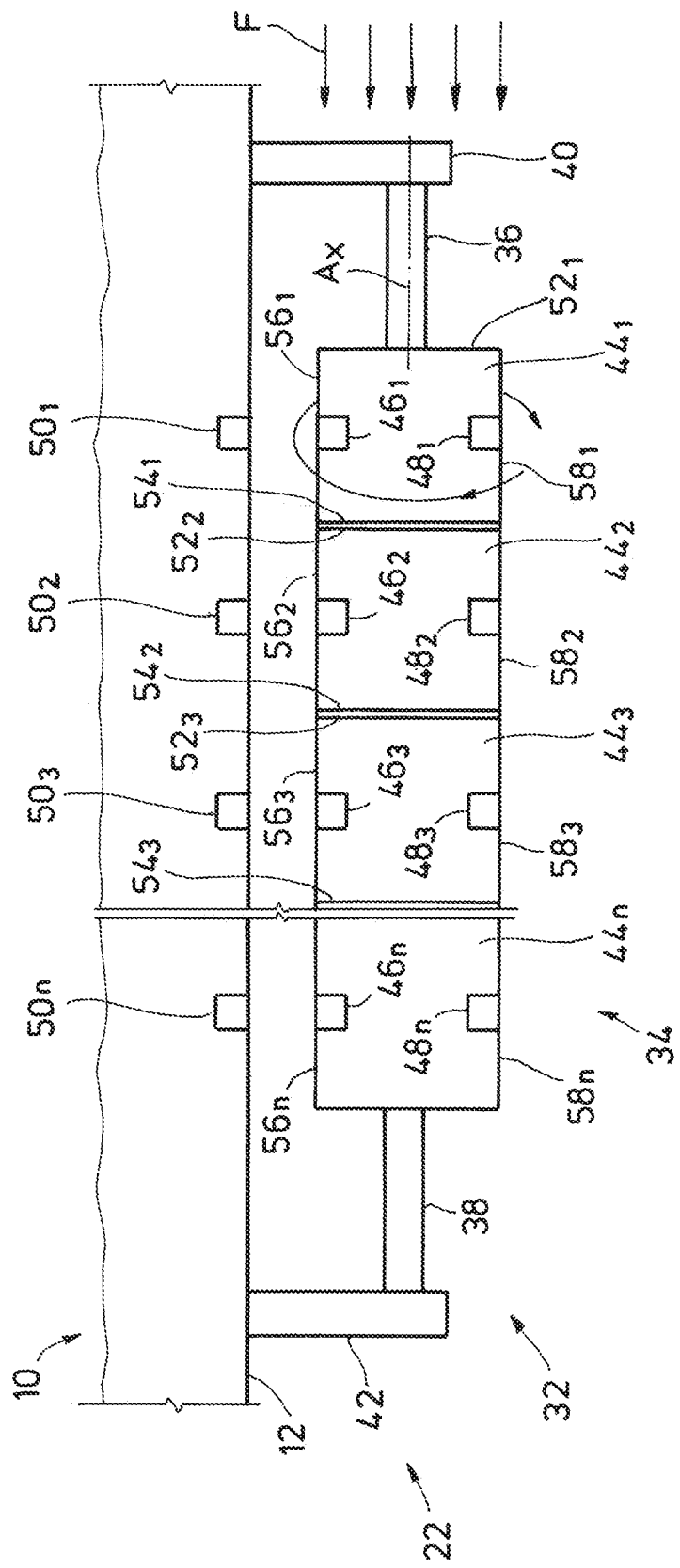
FIG. 2 is a schematic example of a spinner assembly for use with the flowmeter of FIG. 1.

Referring to FIG. 2, shown in a schematic form is an example of a spinner assembly 32 which is included with flow meter 22. Included with spinner assembly 32 is one embodiment of a spinner member 34 illustrated rotatably coupled to a pair of elongated shafts 36, 38, that mount respectively onto supports 40, 42. Spinner member 34 and shafts 36, 38 as shown are generally coaxial with one another, and substantially transverse to supports 40, 42. Supports 40, 42 project radially outward from housing 12 and in the portion of tool 10 having flow meter 22. Spinner member 34 of FIG. 2 includes a number of segments $44_{1-n}$ that are axially oriented to make up the length of the spinner member 34. Magnets $46_{1-n}$, $48_{1-n}$ are shown mounted on opposing lateral edges of each segment $44_{1-n}$, and which can be made of permanent magnets that continuously generate a magnetic field, or electro-magnets that selectively generate a detectable magnetic field. Spinner member 34 rotates, as illustrated in the example of arrow $A_R$, in response to the flow of fluid F. Shafts 36, 38 are optionally rotated with, or with respect to, spinner member 34. A series of sensors $50_{1-n}$ are shown coupled onto housing 12 and which are generally axially located to correspond to magnets $46_{1-n}$, $48_{1-n}$. Thus, with rotation of spinner member 34, as one of the magnets $46_{1-n}$, $48_{1-n}$ pass proximate to an associated sensor $50_{1-n}$, the rotational rate of spinner member 34 can be estimated based on a time stamp of the action of sensing a particular one of the magnets $46_{1-n}$, $48_{1-n}$. Further optionally, the direction of rotation of spinner member 34 can be determined by analysis of data signals collected by sensors $50_{1-n}$. Leading edges $52_{1-n}$ are shown defined on an axial edge of each of the segments $44_{1-n}$ that is proximate the origin of the flow of fluid F. Similarly, following edges $54_{1-n}$ are defined along an axial ledge of each segment $44_{1-n}$ and distal from the direction of the flow of fluid F; and thus on an opposite axial edge of each segment $44_{1-n}$. However, embodiments exist wherein the direction of the flow of fluid F is reversed so that the fluid would reach the following edges $54_{1-n}$ before reaching the corresponding leading edges $52_{1-n}$. In the illustrated example, gaps or spaces are provided between the following edges $54_{1-n}$ and each adjacent leading edge $52_{1-n}$.

As indicated above, the illustration of FIG. 2 is in schematic form where the segments $44_{1-n}$ are each represented as planar members and generally coplanar with the other segments $44_{1-n}$. As described in more detail below, alternate examples exist where the segments $44_{1-n}$ are shaped so that the adjacent leading and following edges $52_{1-n}$, $54_{1-n}$ are not axially aligned or parallel, but angularly offset from one another about axis $A_X$. Further described in more detail below, the angular offsets of the individual segments $44_{1-n}$ provides for a spinner member 34 that is more sensitive to a wide range of flows; and yet provides for the placement of magnets $46_{1-n}$, $48_{1-n}$ on the lateral sides $56_{1-n}$, $58_{1-n}$ of the segments $44_{1-n}$ so they are axially aligned with the sensors $50_{1-n}$ provided on tool 10.

Referring now to FIG. 3, shown in a side perspective view is one example of an alternate embodiment of a spinner member 34A, where in this example the n number of segments $44A_1$-$44A_3$ and associated hardware is three. Here, each of segments $44A_1$-$44A_3$ are generally planar members and shaped into a helicoid configuration and about an axis $A_X$. A recess 60A is shown formed on an axial terminal end of segment $44A_1$ and configured so that shaft 36A (shown in dashed outline) can be received within recess 60A. A corresponding recess 62A is formed on an axial terminal edge of segment $44A_3$ and on a side of the spinner member 34A opposite from recess 60A. Similarly, shaft 38A (shown in dashed outline) mounts into segment $44A_3$ via recess 62A. Receptacles 64A, 66A respectively in the segments $44A_1$, $44A_3$ receive the ends of shafts 36A, 38A therein. The outer surfaces of segments $44A_1$, $44A_3$ project radially outward to accommodate the presence of receptacles 64A, 66A. Pockets 68A$_{1-3}$ are shown formed along lateral edges 56A$_{1-3}$ and provide a place for magnets (not shown) to be inserted therein. Similarly, pockets 70A$_{1-3}$ are formed on lateral edges 58A$_{1-3}$ and for receiving magnets (not shown) therein.

In the example of FIG. 3, a generally planar web 72A is shown with one axial end coupled with following edge 54A$_1$ of segment 44A$_1$, and an opposing axial end coupled with leading edge 52A$_2$ of segment 44A$_2$, thereby coupling segments 44A$_1$, 44A$_2$ to one another. For the purposes of illustration, an example of a polar coordinate system is illustrated having axes X, Y, Z and radius r. Angles theta θ, phi φ, and gamma γ represent angular offsets between radius r and axes Z, Y, and X respectively. In this example, axis Z is substantially aligned with axis A$_X$. Further in the illustrated example, segments 44A$_2$ and 44A$_3$ are coupled to one another by a generally helicoid shaped connector 74A, with opposing axial ends that connect to edges 54A$_2$, 52A$_3$. Using the web 72A and connector 74A to affix adjacent segments 44A$_{1-3}$ introduces a design flexibility so that as depicted adjacent leading and following edges 52A$_{1-3}$, 54A$_{1-3}$ of the segments 44A$_{1-3}$ are not parallel but angularly offset from one another, such as by angle phi φ. In an embodiment, angular offsets above axis Z or axis AX, and that are represented by angle phi φ, are optionally referred to as azimuthal offsets or azimuthal differences. Angularly offsetting leading and following edges 52A$_{1-3}$, 54A$_{1-3}$ positions the lateral edges 56A$_{1-3}$, 58A$_{1-3}$ of the segments 44A$_{1-3}$ so that they extend along paths that each resemble a discontinuous helix. Expressed another way, the lateral edges 56A$_{1-3}$, 58A$_{1-3}$ of the illustrated embodiment do not extend along smooth helical paths that are continuously generally oblique with axis A$_X$, but instead have portions extending along paths that are angled to be more parallel to axis A$_X$. As illustrated, the transverse portions are proximate interfaces between adjacent leading and following edges 52A$_{1-3}$, 54A$_{1-3}$. In an embodiment, the transverse portions so that the angles of the paths with respect to the axis A$_X$ are abruptly changed over a relatively short distance.

Figure 3A:
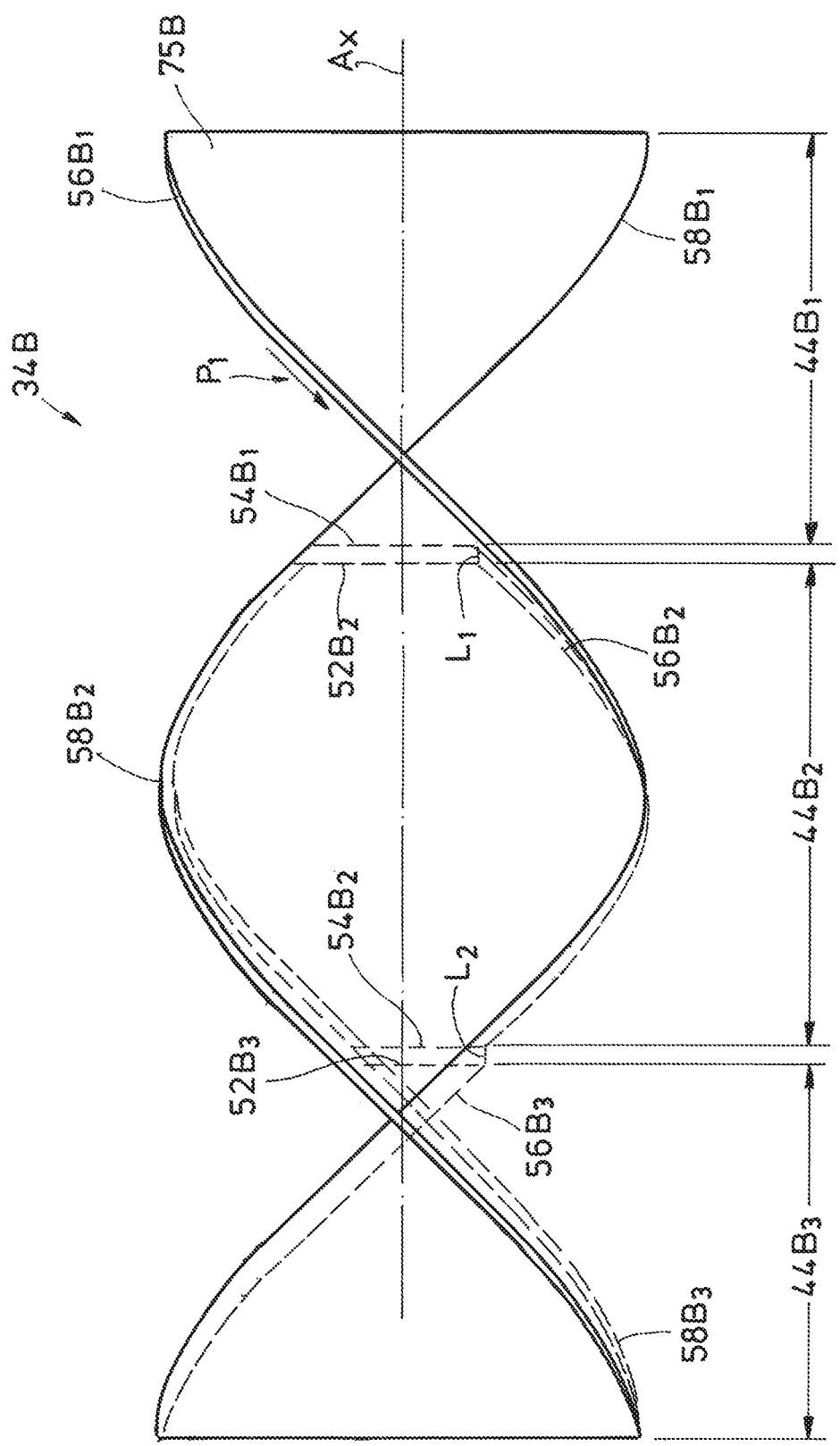
FIG. 3A is a schematic of a helicoid with an example of a spinner member superimposed thereon.

Shown in a side perspective view in FIG. 3A is an example of a helicoid member 75B with lateral edges that extend along paths that approximate continuous helixes. Superimposed onto the helicoid member 75B is spinner member 34B whose segments 44B$_{1-3}$ have adjacent leading and following edges 52B$_{1-3}$, 54B$_{1-3}$ that are axially and angularly offset from one another about axis A$_X$. The comparative illustration provided in FIG. 3A provides an example of how the lateral edges 56B$_{1-3}$, 58B$_{1-3}$ of helicoid member spinner member 34B define discontinuous helixes, and which are different from that of the lateral edges of a helicoid. For example, path P$_1$ as shown runs substantially parallel with a lateral edge of helicoid member 75B, and while an angular orientation of path P$_1$ changes with respect to different axial locations along helicoid member 75B, an angle between path P$_1$ and axis A$_X$ is substantially the same along the length of helicoid member 75B. In contrast, line L$_1$, which extends from a radial end of trailing edge 54B$_1$ to the closest radial end of leading edge 54B$_2$, is oriented along a path that is more parallel to axis A$_X$ than path P$_1$. As shown, segment 44B$_2$ is oriented so that leading edge 52B$_2$ is offset from trailing edge 54B$_1$ in a clockwise direction (when viewed axially from segment 44B$_1$). In an optional embodiment, segment 44B$_2$ is oriented so that leading edge 52B$_2$ is offset from trailing edge in a counterclockwise direction, so that L$_1$ would be oriented more transverse to axis A$_X$ than path P$_1$. Similarly, line L$_2$ is shown which extends from a radial end of trailing edge 54B$_2$ to the closest radial end of leading edge 54B$_3$, is also oriented along a path that is more parallel to axis A$_X$ than path P$_1$.

An advantage of the segments 44A$_{1-3}$ that are angularly offset from one another is that the pockets 68A$_{1-3}$, 70A$_{1-3}$ can be set at axial locations along spinner member 34A and to accommodate design or manufacturing constraints of associated sensors (not shown). Moreover, the shape and contour of spinner member 34A is formed to have maximum sensitivity to the flow of fluid F (FIG. 2) so that rotational rates of the spinner member 34A can provide precise and meaningful results that represent a flow rate of the flow of fluid running adjacent tool 10.

Figure 4:
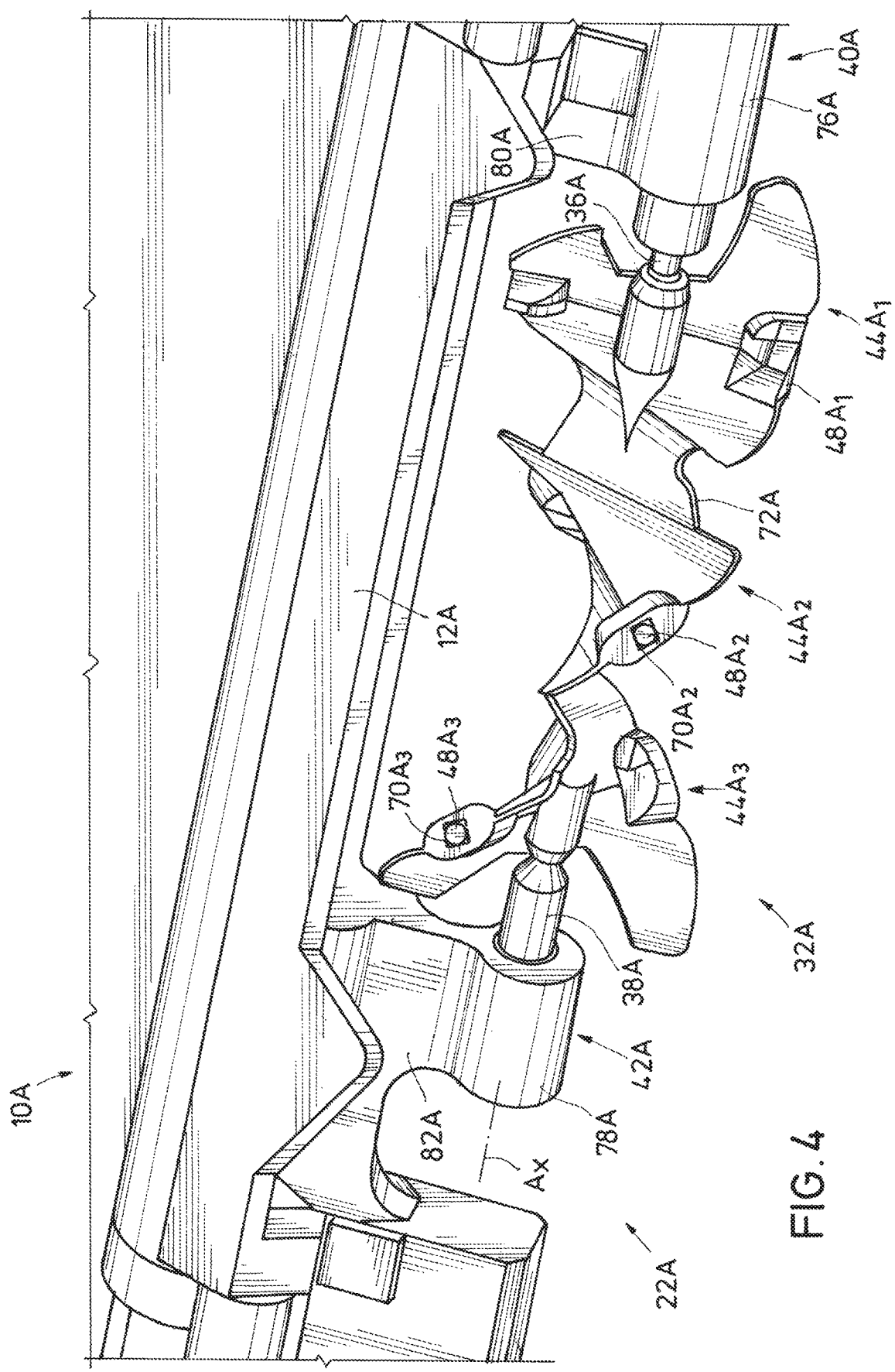
FIG. 4 is a perspective view of an example of a spinner assembly having the spinner member of FIG. 3.

FIG. 4 shows in a side perspective view an example of the flow meter 12A of tool 10A and illustrates spinner member 34A mounted on shafts 36A, 38A. In this example, the supports 40A, 42A each have a cylindrical portion 76A, 78A with an opening that receives ends of shafts 36A, 38A that is distal from spinner member 32A. Ports 40A, 42A further include brackets 80A, 82A which extend from a surface of the cylindrical portions 76A, 78A and engage housing 12A of tool 10A. Brackets 80A, 82A are generally elongate members that have a rectangular cross-section along a line perpendicular to axis A$_X$, and which increases in size with distance away from the cylindrical portions 76A, 78A. Further illustrated in the example of FIG. 4 are magnets 48A$_{1-3}$ disposed in pockets 70A$_{1-3}$, where the pockets 70A$_{1-3}$ are disposed on lateral edges of the spinner member 34A.

Figure 5:
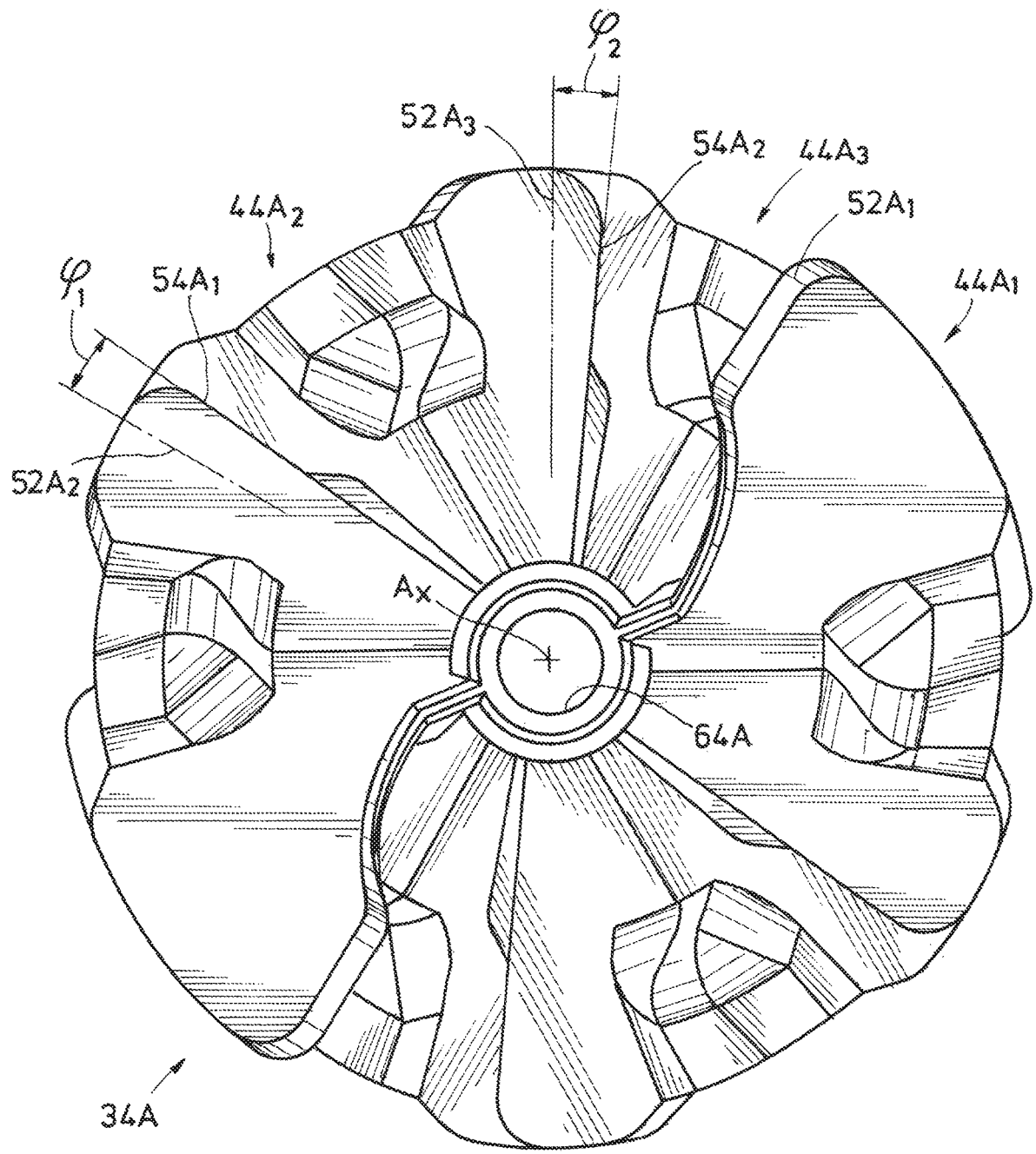
FIG. 5 is an axial view of an example of the spinner member of FIG. 3 and taken along lines 5-5.

FIG. 5 shows in an axial end view one example of spinner member 34A of FIG. 3 and taken along lines 5-5. Here, an angular offset is illustrated between following edge 54A$_1$ and leading edge 52A$_2$, and which is represented by angle phi φ$_1$. Similarly, an angular offset between following edge 54A$_2$ and leading edge 52A$_3$ is shown, and which is represented by angle phi φ$_2$. Further shown in FIG. 5 is how that despite the angular offsets angle phi φ$_1$ and angle phi φ$_2$, the segments 44A$_{1-3}$ cover substantially 360° around the axis A$_X$, thereby maximizing the surface area in contact with fluid hitting spinner member 34A and thus maximizing sensitivity and preciseness of readings for data recorded with the flow meter 22 (FIG. 1).

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the device can be permanently or temporarily disposed downhole. These and other similar modifications will readily suggest themselves to those skilled in the art, and are intended to be encompassed within the spirit of the present invention disclosed herein and the scope of the appended claims.

What is claimed is:

1. A downhole device for use in a wellbore comprising:
   a housing;
   a connector on the housing that selectively connects to a conveyance member; and
   a flowmeter coupled with the housing and that comprises,
      a helicoid shaped spinner member that selectively rotates in response to being disposed in a flow of fluid, and having a discontinuous surface that defines segments with opposing axial ends that are angularly offset from one another,
      features on the spinner member that orbit along a circular path with rotation of the spinner member, and sensors that selectively sense a position of the features;
wherein adjacent segments are joined to one another by a coupling, and the adjacent segments are spaced axially apart from one another.

2. The downhole device of claim 1, wherein the coupling comprises a planar member.

3. The downhole device of claim 1, wherein the coupling comprises a helicoid shaped member.

4. The downhole device of claim 1, wherein adjacent segments have different values of pitch.

5. The downhole device of claim 1, wherein adjacent segments have different lengths.

6. The downhole device of claim 1, wherein the features comprise magnets.

7. The downhole device of claim 1, wherein the segments comprise a forward segment, and wherein a leading edge of the forward segment extends along a path that is generally oblique with an axis of the spinner member.

8. A downhole device for use in a wellbore comprising:
a flowmeter comprising,
helicoid shaped segments that are coupled together end to end to define a spinner member that is selectively disposed in a flow of fluid, and
discontinuities on an outer surface of the spinner member that are formed by separations between the segments; and
a sensor that selectively senses a rotational rate of the spinner member.

9. The downhole device of claim 8, wherein the segments are angularly offset.

10. The downhole device of claim 8, wherein the segments have different value of pitch.

11. The downhole device of claim 8, wherein the segments have different lengths.

12. The downhole device of claim 8, wherein connectors are provided between adjacent segments that couple the segments together.

13. A method of operating a downhole device in a wellbore comprising:
sensing a rotational rate of a spinner member disposed in the downhole device, and which comprises segments coupled end to end and discontinuities along interfaces where the segments are coupled to one another; and
estimating a rate of a flow of fluid in the wellbore based on the sensed rotational rate.

14. The method of claim 13, wherein the discontinuity comprises an angular offset between a trailing edge of a segment and a leading edge of an adjacent segment.

15. The method of claim 13, wherein a magnet that is disposed on a lateral edge of the spinner member, and wherein sensing a rotational rate of the spinner member comprises sensing the presence of the magnet at a location in a point in time.

16. The method of claim 13, wherein the shapes of the segments are configured to maximize a sensitivity of the spinner member in response to the flow of fluid.

* * * * *